UNITED STATES PATENT OFFICE.

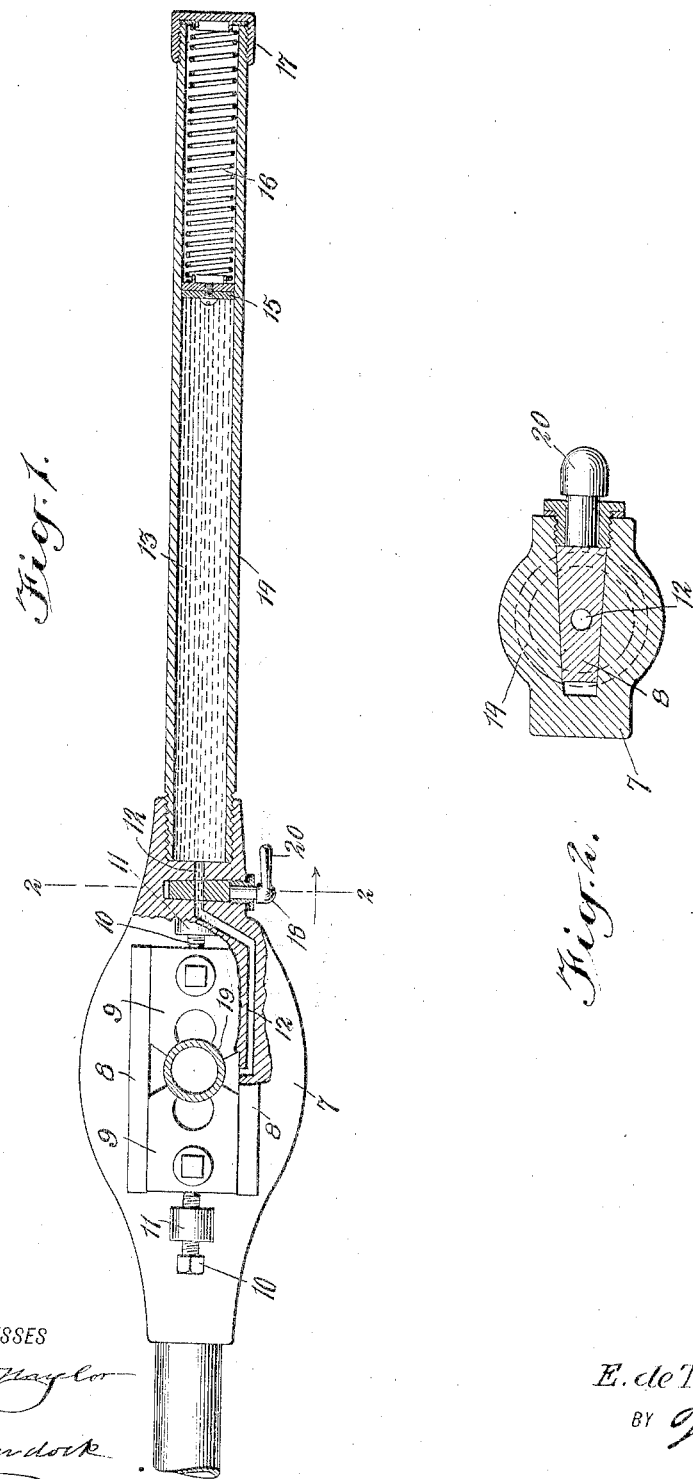

EUGENIO de TEIXEIRA, OF SETAUKET, NEW YORK, ASSIGNOR TO ANNA L. H. de TEIXEIRA, OF SETAUKET, NEW YORK.

PIPE-CUTTING DIE.

1,334,232.   Specification of Letters Patent.   Patented Mar. 16, 1920.

Application filed September 3, 1918. Serial No. 252,428.

*To all whom it may concern:*

Be it known that I, EUGENIO DE TEIXEIRA, a subject of the King of Spain, and a resident of Setauket, in the county of Suffolk and State of New York, have invented a new and Improved Pipe-Cutting Die, of which the following is a full, clear, and exact description.

Among the principal objects which the present invention has in view are: to automatically oil an article during the process of having a screw-thread cut therein; to provide a supply of lubricant carried by a metal cutting instrument; and to prevent the flow of the lubricant during the inactive periods of the cutter.

Drawings.

Figure 1 is a side view partly in section, of thread-cutting dies and a handle therefor having a lubricant reservoir therein, said handle being shown in section;

Fig. 2 is a detail view on an enlarged scale, showing in section the handle and controlling valve for the reservoir therein.

Description.

As seen in the drawings, the handle has a stock plate 7, from the base of which are extended guide rails 8. The rails 8 are provided to hold the die plates 9 when the same rest between the set screws 10 as in active disposition. Threaded lugs 11 support the screws 10 in service.

One of the rails 8 has cut therein a tubular passage 12. The passage 12 opens through the plate 7 to the chamber 13 in one of the handle bars 14. The lubricant employed may be of any desired character, being fluid or mobile, as oil or grease. When grease is employed, a pressure is maintained on the column by means of a plunger 15, and a spring 16. The spring 16 and plunger 15 are removed from the handle bar when the chamber 13 is to be recharged. To this end, the screw cap 17 is removed to permit the withdrawal of the said spring and plunger. During the inactive periods of the tool, the faucet 18 is turned so that the passage therein is disposed perpendicular to the passage 12, the body of the valve then sealing the passage 12 to prevent liquid flowing or passing therethrough.

In service the die plates 9 are fed to the article upon which a thread is being cut, by means of the set screws 10. When the plate 7 and die plates 9 are revolved on the pipe, the handle bar 14 is carried to the position above the pipe 19 in which position the lubricant, if oil, flows from the chamber 13, through the passage 12, to the space between the cutting ends of the plates 9. If the lubricant is mobile in character, such as light grease, the spring 16 and plunger 15 operate on the body thereof to press a supply thereof through the passage 12 to the space between the cutting ends of the plates 9.

When it is desired to discontinue the use of the lubricant, the operator turns the faucet 18 by means of the handle 20.

It will be observed from the foregoing that during the operation of cutting the thread, the necessary lubricant is supplied to assist in the said operation without loss of time or trouble to the mechanic.

Also it is obvious that by manipulating the faucet 18, the supply of lubricant may be carefully controlled. Further, it will be noted that the supply being controlled, the tendency to wastage is avoided, owing to the fact that the mechanic undertakes to provide an excess amount of lubricant in the hope of carrying it over beyond the period for which it is available.

Claim.

A pipe-cutting die, including a stockplate, guide rails positioned within such stockplate, die plates mounted upon such rails, the stockplate and rails being formed with channels, which are adapted to communicate with one another and have their outer extremities terminating on the outer face of the stockplate and rails respectively, the latter end of such channels extending to a point between said die plates, the said stockplate being formed with an opening extending at right angles through the channel formed through the same, a valve, positioned within such opening, adapted to control the flow of fluid through such channel, a hollow handle having its inner end communicating with the channel formed through the stock, and a spring-actuated plunger, for normally forcing fluid from such hollow handle into the channel, positioned in the outer end of such channel.

EUGENIO de TEIXEIRA.